United States Patent [19]

Hudgin

[11] 4,143,096

[45] Mar. 6, 1979

[54] ETHYLENE CARBON MONOXIDE GRAFT COPOLYMERS

[75] Inventor: Donald E. Hudgin, Princeton Junction, N.J.

[73] Assignee: Atlantic Richfield Company, Los Angeles, Calif.

[21] Appl. No.: 864,024

[22] Filed: Dec. 23, 1977

[51] Int. Cl.² ............................................. C08G 67/02
[52] U.S. Cl. ................................................ 260/878 R
[58] Field of Search ..................... 260/878 R; 526/11.1

[56] References Cited

U.S. PATENT DOCUMENTS

| | | | |
|---|---|---|---|
| 3,083,184 | 3/1963 | Loeb ..................................... | 526/11.1 |
| 3,676,401 | 7/1972 | Henry ................................... | 526/11.1 |
| 3,689,460 | 9/1972 | Nozaki .................................. | 526/11.1 |
| 3,694,412 | 9/1972 | Nozaki .................................. | 526/11.1 |
| 3,948,850 | 4/1976 | Hudgin .................................. | 526/11.1 |
| 3,948,873 | 4/1976 | Hudgin .................................. | 526/11.1 |
| 4,024,325 | 5/1977 | Hudgin .................................. | 526/11.1 |
| 4,024,326 | 5/1977 | Hudgin .................................. | 526/11.1 |
| 4,070,532 | 1/1978 | Hammer ................................ | 526/11.1 |
| 4,076,911 | 2/1978 | Fenton .................................. | 526/11.1 |

*Primary Examiner*—Alan Holler
*Attorney, Agent, or Firm*—Coleman R. Reap

[57] ABSTRACT

Graft interpolymers comprised of a polyolefin backbone polymer prepared from at least one α-olefin of two to four carbon atoms onto which is graft copolymerized a mixture of ethylene and carbon monoxide are disclosed.

17 Claims, No Drawings

ETHYLENE CARBON MONOXIDE GRAFT COPOLYMERS

BACKGROUND OF THE INVENTION

This invention relates to graft interpolymers and more particularly to interpolymers prepared by graft copolymerizing a mixture of ethylene and carbon monoxide onto an α-olefin polymer backbone.

Copolymers of carbon monoxide and ethylenically unsaturated materials would be desirable because of the low cost and ready availability of carbon monoxide. Copolymers of ethylene and carbon monoxide have been known for several years but attempts to commercialize these copolymers have not proven successful, largely because of the difficulties of preparing these copolymers at less than very high pressures and with sufficiently high carbon monoxide content to make their preparation and use worthwhile.

Recent advances in the field which make it possible to produce ethylene-carbon monoxide copolymers containing high carbon monoxide contents at moderate pressures has created a new interest in these polymers. U.S. Pat. Nos. 4,024,325 and 4,024,326 describe improved processes for preparing ethylene-carbon monoxide copolymers.

There is also renewed interest in developing other ethylene-carbon monoxide copolymer systems. It has been believed that other polymer systems can be upgraded by incorporating carbon monoxide-containing polymers into them. U.S. Pat. No. 2,495,286 discloses several terpolymers prepared by copolymerizing ethylene, carbon monoxide and various other ethylenically unsaturated monomeric materials.

Other patents of interest are U.S. Pat. Nos. 2,495,285, 2,541,987 and 3,248,359 which disclose blends of ethylene-carbon monoxide copolymer with various polymers.

SUMMARY OF THE INVENTION

New graft copolymers of ethylene and carbon monoxide and a backbone polymer of at least one α-monoolefin have now been prepared which have physical properties unexpectedly superior to physical blends containing the same amounts of ethylene-carbon monoxide copolymer and the same α-monoolefin polymer.

Accordingly, it is an object of the invention to present novel ethylene-carbon monoxide copolymer compositions. It is another object of the invention to present novel graft copolymer compositions of ethylene, carbon monoxide and an α-olefin polymer. It is another object of the invention to present copolymer compositions of ethylene and carbon monoxide and α-monoolefin polymers having improved physical properties. It is another object of the invention to present copolymer compositions of ethylene, carbon monoxide and α-monoolefin polymers having high heat distortion temperatures. It is another object of the invention to present copolymer compositions of ethylene, carbon monoxide and α-monoolefin polymers having high flexural modulus properties. It is another object of the invention to present copolymer compositions of ethylene, carbon monoxide and α-monoolefin polymers having improved impact resistance. It is another object of the invention to present a method of preparing interpolymers of ethylene, carbon monoxide and one or more monoolefin polymers having improved heat distortion temperatures, flexural modulus and/or impact resistance. These and other objects of the invention will be readily apparent upon reading the following detailed description and examples.

The above objects are realized in the graft copolymers of the invention and in the method of their preparation. The graft copolymers comprise a backbone polymer of one or more α-monoolefins having 2 to 4 carbon atoms onto which is grafted a copolymer of ethylene and carbon monoxide. The backbone polymer is desirably solid and often has a number average molecular weight of about 5,000 to 5,000,000 and preferably about 10,000 to 200,000. The α-monoolefins from which the backbone polymer is prepared are ethylene, propylene, the butenes and mixtures of these. The polymer which is grafted onto the backbone polymer is made of ethylene and carbon monoxide. The molar ratio of ethylene to carbon monoxide in the ethylene-carbon monoxide portion of the graft copolymer is usually in the range of 1:1 to about 20:1 and preferably in the range of 1:1 to 3:1 and most preferably in the range of 1:1 to about 2:1. The weight ratio of backbone polymer to ethylene-carbon monoxide copolymer in the graft copolymer usually varies from about 100:1 to 1:100 and preferably from about 10:1 to 1:10. The number average molecular weight of the graft copolymers of the invention is usually in the range of about 6,000 to 5,500,000 and preferably in the range of about 11,000 to 250,000. The melt index of these graft copolymers is usually about 0.01 to 2000 and preferably about 0.2 to 100, as determined by ASTM D-1238-65T (for polypropylene - condition L and for polyethylene - condition E.)

Another aspect of the invention is the preparation of the graft copolymers. These are prepared by copolymerizing ethylene and carbon monoxide in the presence of the α-monoolefin polymer and, optionally, an inert organic solvent using an ionic or free radical catalyst. The catalyst is conveniently present in amounts of about 0.005 to 5% and preferably about 0.1 to 2%, based on the total weight of the monomeric components in the reaction mixture.

DESCRIPTION OF THE INVENTION

As mentioned above, the backbone polymer is prepared from ethylene, propylene, the butylenes or mixtures of these. The particular backbone polymer used in preparing the graft copolymers of the invention will depend upon the properties sought in the polymeric product. Graft copolymers having higher heat distortion temperatures and flexural moduli are obtained when polyethylene, polypropylene and poly 1-butene are used as the backbone polymer. On the other hand, graft copolymers having enhanced impact resistance are prepared when rubbery ethylene-propylene copolymers and polyisobutylene polymers are used as the backbone polymers. Rubbery ethylene-propylene copolymers generally contain ethylene and propylene units in an ethylene to propylene weight ratio of about 1:1 to 3:1. The α-monoolefin polymers and copolymers used as the backbone polymers are well known and commercially available and their preparation forms no part of the present invention. The backbone polymer may be liquid or solid depending on the properties sought in the graft copolymer product. The number average molecular weight of the backbone polymer is not critical and, as noted above, often varies from 5,000 or less up to 5,000,000 or more.

Polymers which are useful as the backbone polymer include polyethylene, polypropylene, poly-1-butene polyisobutylene, poly-2-butene, ethylene-propylene copolymer and other copolymers of these α-monoolefins. Furthermore, if desired, the backbone may be a copolymer of one of the above α-monoolefins with minor amounts of one or more other ethylenically unsaturated monomers, such as butadiene, styrene, etc. The amount of these additional monomer components present in the backbone polymer may vary up to about 50% and is preferably limited to about 10 to 40%, based on the total weight of polymeric materials in the backbone polymer.

Other additives such as plasticizers, antioxidants, fillers, lubricants, etc. may be included in the backbone polymer composition.

The preferred method for preparing the graft copolymer is by copolymerizing ethylene and carbon monoxide in the presence of the backbone, although other methods of preparation, such as graft copolymerizing ethylene-carbon monoxide copolymers onto poly-α-monoolefin polymers, may be useful for preparing the graft copolymers of the invention. In the preferred procedure the reaction can be carried out under batch or continuous conditions, preferably in a reaction vessel which can withstand high pressures and the corrosive effects of carbon monoxide. Stainless steel or glass lined reactors are generally considered to be suitable materials for the inside surfaces of the reactor.

The temperature at which the graft copolymerization is carried out may vary from about 20° C. or less to about 350° C. or higher. The optimum reaction temperature will depend upon the catalyst being used, the reaction pressure, the particular backbone polymer, etc. In general it is desirable to carry out the reaction at lower temperatures, such as in the range of about 20° C. to 100° and preferably about 20° C. to 70° C., rather than at higher temperatures because higher molecular weight product is obtained and less reactor fouling occurs at lower temperatures.

The reaction pressure may vary from atmospheric up to 50,000 psig or more. It is desirable to maintain the pressure only as high as is necessary to obtain the desired product since high pressures present problems of equipment breakdown and reactor leakage. Pressures in the range of about 500 to 30,000 psig are preferred.

The graft copolymerization is preferably carried out using a free radical catalyst. Such catalysts include organic peroxides, such as benzoyl peroxide, lauroyl peroxide, succinoyl peroxide, t-butyl peroxypivalate, dioxan peroxide, diethyl dioxide, peracetic acid, perbenzoic acid, dicyclohexylperoxydicarbonate, dicetylperoxydicarbonate, potassium peroxydisulfate; azo compounds, such as 2,2'-azobis(isobutyronitrile), etc.

The catalyst concentration may vary depending upon the properties desired in the product and the temperature at which the reaction is to be carried out. In general, the catalyst is effective at concentrations as low as about 0.005% based on the total weight of polymerizable monomer present and amounts up to about 5% or more will produce the desired result. It is preferred to use the catalyst at a concentration of about 0.1 to 2%, based on the total weight of polymerizable monomer present in the reaction mixture.

The reaction may be carried out either in the presence of or the absence of a solvent or diluent for the reactants. In general, it is preferable to use a solvent or diluent to prevent local heat buildup and to reduce the viscosity of the polymerizing mass. Solvents or diluents used are desirably volatile so that they can be more easily removed from the polymeric product. Suitable solvents and diluents include aliphatic, cycloaliphatic, and aromatic hydrocarbons such as isooctane, cyclohexane, benzene, etc.; ethers such as dioxane, propylene oxide, etc.; and other organic or inorganic liquids which are free of substituents or impurities which interfere with the desired reaction between the ethylene and the carbon monoxide. Two or more solvents and/or diluents can be used in combination in the process of the invention.

The ratio of ethylene to carbon monoxide in the reaction vessel may vary depending upon the type of product being prepared. When preparing copolymers with substantial carbon monoxide contents, the weight ratio of ethylene to carbon monoxide is desirably maintained in the range of about 4:1 to 1:4. The gas charge may contain inert gases such as nitrogen which serves as a gaseous diluent or it may contain only ethylene and carbon monoxide. In the latter case the gas charge preferably contains about 80 to 20% ethylene and about 20 to 80% carbon monoxide. The ratio of ethylene and carbon monoxide may be varied as the polymerization reaction proceeds, if desired. In this way the constitution of the polymer chains can be varied.

Other ethylenically unsaturated monomers which polymerize with ethylene and/or carbon monoxide can be included in the reaction mixture formulation to modify the properties of the polymeric product. Includable as suitable monomers are alkenes containing 3 to 8 carbon atoms such as propylene, isobutylene, hexene, etc.; cycloaliphatic compounds such as cyclohexene, etc.; aromatic substituted alkenes such as styrene, etc.; acrylic compounds such as ethyl acrylate or methyl methacrylate, acrylonitrile, etc.; vinyl esters such as vinyl acetate, etc.; vinyl halides such as vinyl chloride, vinylidene chloride, etc.; dienes such as butadiene, isoprene, 2-chlorobutadiene, etc. The amount of other polymerizable monomer or monomers used in the ethylene-carbon monoxide reaction mixture will be determined by the properties desired in the product. In general, if other polymerizable monomeric compounds are included in the formulation, it is preferred to limit the quantity of such other compounds to minor accounts such as up to about 45% base on the total weight of monomeric components present in the reaction mixture.

Reaction conditions for the graft copolymerization reaction are the same as those set forth in greater detail in U.S. Pat. Nos. 2,495,286, 4,024,325, and 4,024,326 and the disclosures of these patents are incorporated herein by reference.

In accordance with a preferred embodiment of the invention, the α-monoolefin polymer, a solvent, if one is used, the catalyst and any desired polymerization modifiers or other desired additives are charged to a suitable reaction vessel and the reaction vessel is flushed with an inert gas, such as nitrogen, for a sufficient period of time to remove oxygen. The reaction vessel is then sealed and pressured with an ethylene-carbon monoxide gas mixture. When the desired pressure is reached the flow of ethylene-carbon monoxide gas mixture to the reactor is stopped. Heat is then applied to the reaction vessel to initiate the reaction and the vessel contents are heated to and maintained at the desired temperature until the reaction is completed. The pressure is maintained by introducing additional ethylene and carbon monoxide from time to time as they are used up in the reaction. When the polymerization is completed, the reactor contents are cooled and the solvent is separated from the polymer by any desired method, for example, by distillation, and the polymeric product is recovered.

Other additives such as plasticizers antioxidants, molecular weight regulators, coloring agents fillers, lubricants, etc. may be incorporated into the formulation prior to, during or subsequent to the polymerization reaction. It is usually more efficient and economical to incorporate fillers and other inert materials into the polymerized product in a post polymerization blending operation.

The polymers of the invention are useful as engineering plastics. These polymers can be used in the manufacture of plastic pipe such as sewer and drainage pipe. They can also be used for the manufacture of plastic containers, particularly where biodegradable properties are desired. These polymers have properties which render them well adaptable to extrusion, injection molding, sheet thermoforming, and other conventional manufacturing methods.

The following examples illustrate specific embodiments of the invention. Unless otherwise stated parts and percentages are on a weight basis.

EXAMPLE 1

A 1 liter Parr Instrument Company reactor (Model 4521) is charged with 500 ml. propylene oxide as a solvent, 75g. finely divided low density polyethylene having a number average molecular weight of 17,500 and a melt index of 5 (sold by U.S. Industrial Chemicals Company under the trademark "Microthene F", Type FN-510) and 1g. dicyclohexylperoxycarbonate (sold by Lucidol Corporation under the trademark "Luperox 229"). The reactor is closed and the contents purged with prepurified nitrogen for 30 minutes. The reactor is then pressurized to 1000 psig with a 50/50 carbon monoxide-ethylene mixture. The polymerization is allowed to run for 69 hours during which time the temperature is maintained in the range of 31 to 39° C. and the pressure is maintained in the range of 730 to 1020 psig by periodically pressurizing the reactor to 1000 psig. with the 50/50 carbon monoxide-ethylene mixture. The reactor is then depressured and opened. The solvent is allowed to evaporate leaving a dense wet powdery product. The product is vacuum dried at 80° for approximately 12 hours. On analysis the product is found to have an oxygen content of 10.94%, which calculates to 19.2% carbon monoxide. The product weighs 150.0g. and has a melt index of 0.06.

EXAMPLE 2

The procedure of Example 1 is repeated except that only 50g. of the low density polyethylene is used. The reactor is pressured to 1100 psi with the 50/50 ethylene-carbon monoxide mixture and the pressure is maintained in the range of 830 to 1100 psig, and the temperature in the range of 30° to 45° C. during the reaction period. The time of reaction is 35 hours. The product is recovered as in Example 1. On analysis the product has an oxygen content of 17.58% which is equivalent to 30.77% carbon monoxide. The weight of the recovered product is 129.4g.

EXAMPLE 3

A polymeric product is prepared by the procedure of Example 2 except the reaction is pressured first with a 30/70 ethylene-carbon monoxide mixture to 1000 psig and periodically repressured during the reaction to 1000 psig with a 50/50 ethylene-carbon monoxide mixture. During the reaction the temperature is maintained in the range of 28° to 34° C. and the pressure in the range of 600 to 1030 psig. The reaction is run for 57 hours. The product weighs 100g. and on analysis is found to have an oxygen content of 5.67% which is equivalent to 9.92% carbon monoxide and a melt index of 1.0.

EXAMPLE 4

A 1 liter Parr Instrument Company reactor (Model 4521) is charged with 500 ml. benzene and 1g. tertiary butyl peroxypivalate as catalyst. The reactor is closed and the contents purged with prepurified nitrogen for 30 minutes while stirring. The reactor is then pressured to 1000 psig with a 50/50 mixture of ethylene and carbon monoxide and the temperature raised rapidly to 60° C. (about 15 minutes). The temperature is held at 60°–70° C. and the pressure range is maintained between 900 to 1200 psig. for the remainder of the reaction period. When the pressure drops below 1000 psig, additional 50/50 ethylene-carbon monoxide gas is added. When the reactor shows no pressure drop over a six (6) hour period, the reactor is turned off, allowed to cool, depressured, opened and the contents placed in a pyrex dish. The benzene solvent is allowed to evaporate off at room temperature under a mild air stream. The product is heated in a vacuum oven at 80° C. for approximately 12 hours. The product weighs 44.2g. and has a melting range of 165°–170° C. On analysis the copolymer is found to have an oxygen content of 26.0% which is equivalent to 45.5% carbon monoxide.

EXAMPLE 5

Physical blends of the ethylene-carbon monoxide copolymer of Example 4 are prepared as follows:

The copolymer prepared in Example 4 is finely ground and passed through a 200 mesh screen. One part by weight of this copolymer is mixed with four parts of Microthene F. This mixture is blended in a melt blender (marketed by Brabender Corporation under a trademark Plasticorder) at 200° C. for five minutes, producing a molten homogeneous blend. The molten mass from the Plasticorder is converted into a sheet by passage through the rolls of a roll mill. The sheet is cut into strips.

EXAMPLE 6

A blend is prepared by the same procedure as used for the preparation of the Example 5 blend except that the blend consists of two parts of the copolymer prepared in Example 4 and three parts of the low density polyethylene.

Test bars having dimensions of 6 inches × ½ inch × ⅛ inch are injection molded from the products of Examples 1, 3, 5, 6 and pure low density polyethylene (Microthene F), used as a control. The mold temperature is maintained at 90° F. and a dwell time of 60 seconds is employed during the molding operation. Heat distortion temperatures and flexural moduli are determined on the test bars. The results of these determinations are reported in Table I.

TABLE I

| Products Tested | CO Content | Heat Deflection Temperature (66 psi)[1] | Flexural Modulus[2] |
|---|---|---|---|
| Example 1 | | | |

TABLE I-continued
Comparison of Test Results of the Graft Copolymers and the Blends

| Products Tested | CO Content | Heat Deflection Temperature (66 psi)[1] | Flexural Modulus[2] |
|---|---|---|---|
| (graft copolymer) Example 3 | 19.2% | 106° C. | 95,000 psi |
| (graft copolymer) Example 5 | 9.9% | 89° C. | 60,000 psi |
| (physical blend) Example 6 | 18.2% | 95° C. | 62,000 psi |
| (physcial blend) | 9.1% | 89° C. | 49,000 psi |
| Control (LDPE melt index 5.0) | 0.0% | 75° C. | 36,000 psi |

[1] Determined by ASTM D648
[2] Determined by ASTM D790

The foregoing examples illustrate an aspect of the invention. A comparison of Examples 1 and 5 illustrates that a graft prepared by polymerizing an ethylene-carbon monoxide mixture in the presence of polyethylene has a considerably greater heat deflection temperature and an almost two-fold greater flexural modulus than a polymeric composition containing substantially the same amount of carbon monoxide but which is prepared by blending a mixture of ethylene-carbon monoxide copolymer with polyethylene. A comparison of Examples 3 and 6 show a similar increase in the flexural modulus of the graft copolymer compared to the simple blend; however, the heat deflection temperatures of the two samples are the same. Note that the Example 3 and 6 polymers contain only about half as much carbon monoxide as the Example 1 and 5 polymers. The control run shows the heat deflection temperature and flexural modulus of unmodified polyethylene.

EXAMPLE 7

A graft copolymer is prepared in accordance with the procedure of Example 1 except that a rubbery copolymer containing 50 weight percent ethylene and 50 weight percent propylene is used in place of the low density polyethylene. The resulting product will have a significantly greater impact resistance than a copolymer blend prepared by physically blending ethylene-carbon monoxide copolymer and ethylene-propylene copolymer and continuing the same total amounts of the three components.

EXAMPLE 8

A graft copolymer is prepared in accordance with the procedure of Example 1 except that polyisobutylene is substituted for the low density polyethylene. The resulting product will have a significantly greater impact resistance than a copolymer blend prepared by physically blending ethylene-carbon monoxide copolymer with polyisobutylene in the same component weight ratio as the graft copolymer.

Although the above examples set forth specific details of the invention, it is understood that the scope of the invention is determined by the breadth of the appended claims.

I claim:

1. A polymeric composition having a number average molecular weight of about 5,000 to 5,500,000 comprised of an ethylene-carbon monoxide copolymer graft-copolymerized onto a backbone polymer comprised of at least one α-monoolefin containing 2 to 4 carbon atoms, the weight ratio of ethylene-carbon monoxide copolymer to poly α-monoolefin in said graft copolymer being in the range of 100:1 to 1:100 and the molar ratio of ethylene to carbon monoxide in said ethylene-carbon monoxide copolymer being in the range of 1:1 to about 20:1.

2. The polymeric composition of claim 1 wherein said poly α-monoolefin is polyethylene.

3. The polymeric composition of claim 1 wherein the weight ratio of ethylene-carbon monoxide to poly α-monoolefin in the graft copolymer is in the range of about 10:1 to 1:10.

4. The polymeric composition of claim 1 wherein the molar ratio of ethylene to carbon monoxide in said ethylene-carbon monoxide copolymer is in the range of 1:1 to about 3:1.

5. The polymeric composition of claim 1 wherein the graft copolymer has a number average molecular weight of about 11,000 to 250,000.

6. The polymeric composition of claim 1 wherein said poly α-monoolefin has a number weight molecular weight of about 5,000 to 5,000,000.

7. A polymeric composition having a number average molecular weight of about 11,000 to 250,000 comprised of an ethylene-carbon monoxide copolymer graft-copolymerized onto polyethylene having a number average molecular weight of about 10,000 to 200,000, the weight ratio of ethylene-carbon monoxide copolymer to polyethylene being in the range of about 1:100:100:1 and the molar ratio of ethylene to carbon monoxide in the ethylene-carbon monoxide copolymer being in the range of 1:1 to about 20:1.

8. The polymeric composition of claim 7 wherein the weight ratio of ethylene-carbon monoxide to polyethylene is in the range of about 1:10 to 10:1 and the molar ratio of ethylene to carbon monoxide in the ethylene carbon monoxide copolymer is 1:1 to about 2:1.

9. A process for preparing ethylene-carbon monoxide-α-monoolefin polymeric compositions having superior physical properties comprising copolymerizing ethylene and carbon monoxide in the presence of a polymer of an α-monoolefin having 2 to 4 carbon atoms.

10. The process of claim 9 wherein the α-monoolefin polymer is polyethylene.

11. The process of claim 9 wherein the α-monoolefin polymer is polypropylene.

12. The process of claim 9 wherein the α-monoolefin polymer is ethylene-propylene copolymer.

13. The process of claim 9 wherein the polymerization reaction is catalyzed by a free radical catalyst.

14. The process of claim 13 wherein the free radical catalyst is selected from the group consisting of organic peroxides, organic peroxydicarbonates and azo catalysts.

15. The process of claim 9 wherein the polymerization reaction is carried out at a temperature of about 20° C. to 350° C. and at pressure of about atmospheric to 50,000 psig.

16. A process for preparing ethylene-carbon monoxide-α-monoolefin copolymers having improved physical properties comprising polymerizing a gaseous mixture of ethylene and carbon monoxide in the presence of a polymer selected from the group consisting of polyethylene, polypropylene, polybutene, polyisobutylene and mixtures of these at a temperature of about 20° to 100° C. and a pressure of about 500 to 30,000 psig using as a catalyst 0.005 to 5% based on the total weight of monomer of a free radical catalyst.

17. The process of claim 16 wherein the polymerization reaction is carried out in an inert organic solvent.

* * * * *